(12) United States Patent
Holladay et al.

(10) Patent No.: US 12,288,904 B2
(45) Date of Patent: Apr. 29, 2025

(54) INTEGRATED REFUELING STATION

(71) Applicants: Battelle Memorial Institute, Richland, WA (US); Emerald Energy NW, LLC, Bothell, WA (US)

(72) Inventors: Jamie D. Holladay, Richland, WA (US); John Barclay, Richland, WA (US)

(73) Assignees: Battelle Memorial Institute, Richland, WA (US); Emerald Energy NW, LLC, Bothell, WA (US)

( * ) Notice: Subject to any disclaimer, the term of this patent is extended or adjusted under 35 U.S.C. 154(b) by 175 days.

(21) Appl. No.: 17/543,318

(22) Filed: Dec. 6, 2021

(65) Prior Publication Data
US 2022/0115680 A1    Apr. 14, 2022

Related U.S. Application Data

(62) Division of application No. 15/438,536, filed on Feb. 21, 2017, now Pat. No. 11,233,254.
(Continued)

(51) Int. Cl.
*H01M 8/04082*    (2016.01)
*F25B 21/00*    (2006.01)
(Continued)

(52) U.S. Cl.
CPC ......... *H01M 8/04208* (2013.01); *F25B 21/00* (2013.01); *F25J 1/001* (2013.01);
(Continued)

(58) Field of Classification Search
CPC ..... F25B 21/00; F25B 2321/002; F25J 1/001; F25J 1/0022; F25J 1/0221; F25J 1/0227;
(Continued)

(56) References Cited

U.S. PATENT DOCUMENTS 3,108,444 A * 10/1963 Kahn ............... F25B 21/00
62/3.1
3,841,107 A    10/1974 Clark
(Continued)

FOREIGN PATENT DOCUMENTS

WO    WO 2017/149434    9/2017

OTHER PUBLICATIONS

Astronautics Corporation of America; Jul. 2, 1992; "Final Report on the Magnetic Liquefier for Hydrogen Project"; DOE Contract No. DE-AC02-90CE40895.
(Continued)

*Primary Examiner* — Ljiljana V. Ciric
(74) *Attorney, Agent, or Firm* — Klarquist Sparkman, LLP

(57) ABSTRACT

A system that includes: (a) a liquid natural gas storage tank fluidly coupled to a first compressor, (b) a fuel cell having an inlet fluidly coupled to the first compressor and an $H_2$ gas outlet fluidly coupled to a heat exchanger, wherein the heat exchanger receives compressed liquid natural gas from the first compressor; (c) an active magnetic regenerative refrigerator $H_2$ liquefier that comprises at least one layer of a magnetic refrigerant material, wherein the active magnetic regenerative refrigerator $H_2$ liquefier receives cooled $H_2$ gas from the heat exchanger.

10 Claims, 6 Drawing Sheets

Related U.S. Application Data

(60) Provisional application No. 62/298,356, filed on Feb. 22, 2016.

(51) Int. Cl.
*F25J 1/00* (2006.01)
*F25J 1/02* (2006.01)
*H01M 8/12* (2016.01)

(52) U.S. Cl.
CPC ............ *F25J 1/0022* (2013.01); *F25J 1/0221* (2013.01); *F25J 1/0227* (2013.01); *F25B 2321/002* (2013.01); *F25J 2210/62* (2013.01); *F25J 2260/30* (2013.01); *F25J 2270/908* (2013.01); *H01M 2008/1293* (2013.01); *H01M 2250/20* (2013.01); *H01M 2250/407* (2013.01); *Y02B 30/00* (2013.01); *Y02E 60/50* (2013.01); *Y02T 90/40* (2013.01)

(58) Field of Classification Search
CPC ................. F25J 2210/62; F25J 2260/30; F25J 2270/908; H01M 8/04208; H01M 2008/1293; H01M 2250/20; H01M 2250/407; Y02B 30/00; Y02E 60/50; Y02T 90/40
See application file for complete search history.

(56) References Cited

U.S. PATENT DOCUMENTS

| | | | |
|---|---|---|---|
| 4,107,935 A | 8/1978 | Steyert, Jr. | |
| 4,319,893 A | 3/1982 | Hatch et al. | |
| 4,332,135 A * | 6/1982 | Barclay | F25B 21/00 505/894 |
| 4,408,463 A * | 10/1983 | Barclay | F25B 21/00 505/891 |
| 4,507,927 A * | 4/1985 | Barclay | F25B 21/00 505/891 |
| 4,702,090 A | 10/1987 | Barclay | |
| 4,704,871 A | 11/1987 | Barclay et al. | |
| 4,727,722 A * | 3/1988 | Kirol | F25B 21/00 62/3.1 |
| 4,829,770 A | 5/1989 | Barclay | |
| 5,124,215 A | 6/1992 | Hashimoto | |
| 5,182,914 A | 2/1993 | Barclay et al. | |
| 5,213,630 A | 5/1993 | Hashimoto | |
| 5,249,424 A * | 10/1993 | DeGregoria | F25J 1/001 62/3.1 |
| 5,435,137 A | 7/1995 | Gschneidner, Jr. et al. | |
| 5,444,983 A | 8/1995 | Howard | |
| 5,462,610 A | 10/1995 | Gschneidner, Jr. et al. | |
| 5,641,424 A | 6/1997 | Ziolo et al. | |
| 5,743,095 A | 4/1998 | Gschneidner, Jr. et al. | |
| 5,887,449 A | 3/1999 | Pecharsky et al. | |
| 6,245,250 B1 | 6/2001 | Krawzak et al. | |
| 6,332,323 B1 | 12/2001 | Reid et al. | |
| 6,467,274 B2 * | 10/2002 | Barclay | F25J 1/001 62/607 |
| 6,526,759 B2 | 3/2003 | Zimm et al. | |
| 6,589,366 B1 | 7/2003 | Gschneidner, Jr. et al. | |
| 6,676,772 B2 | 1/2004 | Saito et al. | |
| 7,076,959 B2 | 7/2006 | Lewis | |
| 7,744,677 B2 * | 6/2010 | Barclay | B01D 53/0462 95/114 |
| 8,025,720 B2 * | 9/2011 | Barclay | B01D 53/0462 96/115 |
| 8,037,692 B2 * | 10/2011 | Muller | F25B 21/00 62/3.1 |
| 8,061,147 B2 | 11/2011 | Dinesen | |
| 8,099,964 B2 | 1/2012 | Saito et al. | |
| 8,104,293 B2 * | 1/2012 | Barve | F25B 21/00 62/3.1 |
| 8,429,920 B2 * | 4/2013 | Duval | F25B 21/00 62/3.1 |
| 8,541,140 B2 * | 9/2013 | Lee | H01M 8/0618 429/444 |
| 8,551,210 B2 | 10/2013 | Reppel et al. | |
| 8,683,815 B2 | 4/2014 | Muller et al. | |
| 8,701,751 B2 * | 4/2014 | Muller | F28F 9/26 62/3.1 |
| 8,763,411 B2 * | 7/2014 | Wray | F28D 7/10 62/67 |
| 8,852,328 B2 * | 10/2014 | Barclay | C07C 7/12 165/88 |
| 8,935,927 B2 | 1/2015 | Kobayashi et al. | |
| 9,010,132 B2 * | 4/2015 | Wray | F16L 55/103 62/66 |
| 9,175,885 B2 | 11/2015 | Katter | |
| 9,245,673 B2 | 1/2016 | Carroll et al. | |
| 9,302,215 B2 * | 4/2016 | Barclay | C07C 7/12 |
| 9,310,108 B2 | 4/2016 | Kaji et al. | |
| 9,528,728 B2 * | 12/2016 | Smith | F25B 21/00 |
| 9,528,780 B2 * | 12/2016 | Wray | F25D 3/10 |
| 9,677,792 B2 | 6/2017 | Auringer et al. | |
| 9,739,510 B2 | 8/2017 | Hassen | |
| 9,746,214 B2 | 8/2017 | Zimm et al. | |
| 9,777,952 B2 | 10/2017 | Eriksen et al. | |
| 9,791,182 B2 | 10/2017 | Muller | |
| 9,797,630 B2 | 10/2017 | Benedict et al. | |
| 9,995,511 B2 | 6/2018 | Leonard et al. | |
| 10,138,139 B2 | 11/2018 | Kokkinos et al. | |
| 10,229,775 B2 | 3/2019 | Scharf et al. | |
| 10,281,176 B2 | 5/2019 | Mun et al. | |
| 10,384,926 B1 * | 8/2019 | Kaufman | F25J 1/0236 |
| 10,443,928 B2 * | 10/2019 | Holladay | F25J 1/0225 |
| 10,520,229 B2 | 12/2019 | Schroeder et al. | |
| 10,527,325 B2 | 1/2020 | Schroeder et al. | |
| 10,551,095 B2 | 2/2020 | Schroeder | |
| 10,557,649 B2 | 2/2020 | Schroeder | |
| 10,612,668 B1 * | 4/2020 | Barclay | F25B 21/00 |
| 10,641,539 B2 | 5/2020 | Schroeder | |
| 10,648,704 B2 | 5/2020 | Schroeder | |
| 10,648,705 B2 | 5/2020 | Schroeder | |
| 10,648,706 B2 | 5/2020 | Schroeder | |
| 10,684,044 B2 | 6/2020 | Schroeder | |
| 11,009,290 B2 * | 5/2021 | Holladay | F25J 1/001 |
| 11,231,225 B2 * | 1/2022 | Holladay | F25J 1/0225 |
| 11,233,254 B2 * | 1/2022 | Holladay | F25J 1/0227 |
| 11,309,561 B2 * | 4/2022 | Irie | H01M 8/04097 |
| 11,391,511 B1 * | 7/2022 | Thomas | F25J 1/004 |
| 11,437,634 B2 * | 9/2022 | Irie | H01M 8/0662 |
| 11,780,312 B1 * | 10/2023 | Kaufman | F25J 1/0251 60/651 |
| 11,876,256 B2 * | 1/2024 | Ozawa | H01M 8/04268 |
| 11,936,078 B2 * | 3/2024 | Ozawa | H01M 8/04111 |
| 11,946,679 B1 * | 4/2024 | Kaufman | F01N 3/0205 |
| 12,027,732 B2 * | 7/2024 | Earl | H01M 8/04111 |
| 2002/0040583 A1 | 4/2002 | Barclay et al. | |
| 2006/0080979 A1 | 4/2006 | Kitanovski et al. | |
| 2007/0144181 A1 | 6/2007 | Kitanovski et al. | |
| 2008/0016907 A1 | 1/2008 | Barclay et al. | |
| 2008/0314049 A1 | 12/2008 | Shin et al. | |
| 2010/0175392 A1 | 7/2010 | Malloy et al. | |
| 2010/0212327 A1 | 8/2010 | Barve et al. | |
| 2011/0048032 A1 | 3/2011 | Chang et al. | |
| 2011/0062821 A1 | 3/2011 | Chang et al. | |
| 2011/0308258 A1 | 12/2011 | Smith et al. | |
| 2013/0019610 A1 | 1/2013 | Zimm et al. | |
| 2013/0042632 A1 | 2/2013 | Muller et al. | |
| 2014/0099245 A1 | 4/2014 | Hamad | |
| 2015/0068219 A1 | 3/2015 | Komorowski et al. | |
| 2015/0120166 A1 * | 4/2015 | Fisher | B61C 17/02 701/1 |
| 2015/0168030 A1 | 6/2015 | Leonard et al. | |
| 2017/0241706 A1 * | 8/2017 | Holladay | F25B 21/00 |
| 2017/0244120 A1 * | 8/2017 | Holladay | F25J 1/0227 |
| 2017/0372821 A1 | 12/2017 | Scharf et al. | |
| 2018/0283740 A1 | 10/2018 | Holladay et al. | |
| 2018/0283772 A1 | 10/2018 | Holladay et al. | |
| 2019/0137171 A1 | 5/2019 | Barclay et al. | |

(56) References Cited

U.S. PATENT DOCUMENTS

| | | | |
|---|---|---|---|
| 2019/0352747 A1 | 11/2019 | Ihnfeldt et al. | |
| 2019/0390899 A1 | 12/2019 | Holladay et al. | |
| 2022/0115680 A1* | 4/2022 | Holladay | H01M 8/04208 |
| 2022/0320555 A1* | 10/2022 | Kaufman | F22B 1/006 |
| 2022/0407096 A1* | 12/2022 | Ozawa | H01M 8/04783 |

OTHER PUBLICATIONS

Barclay et al., "Active Magnetic Regenerative Liquefier: Final Report," Heracles Energy Corporation d.b.a Prometheus Energy, Jan. 12, 2016.
Barclay et al., "Active Magnetic Regenerative Liquefier: SBIR Phase I Final Report," 47 pages, U.S. Department of Energy Contract No. DOE SBIR DE-FG02-07ER84783, 2007.
Barclay et al., "Unique features of liquefaction of hydrogen and natural gas using magnetic refrigeration," *Proceedings of the 6th International Conference on Magnetic Refrigeration*, pp. 1-6, Sep. 7-10, 2014.
Barclay, "The theory of an active magnetic regenerative refrigerator," NASA Conference Publication, 13 pages, 1983.
Carpetis, "An assessment of the efficiency and refrigeration power of magnetic refrigerators with ferromagnetic refrigerants," *Advances in Cryogenic Engineering*, vol. 39.,1994.
Chen et al., "Development of a brassboard active magnetic regenerative refrigeration system for low temperature remote cooling," *Cryocoolers*, vol. 20, International Cryocooler Conference, Jun. 2018.
Degregoria et al., "Modeling the Active Magnetic Regenerator" *Advances in Cryogenic Engineering*, vol. 37, pp. 867-873, 1992.
Final Office Action issued for U.S. Appl. No. 16/563,692 on Jul. 28, 2020.
Holladay et al., "111.10 Magnetocaloric Hydrogen Liquefaction FY 2016 Annual Progress Report," Pacific Northwest National Laboratory, 2016.
Holladay et al., "111.14 Magnetocaloric Hydrogen Liquefaction FY 2015 Annual Progress Report," Pacific Northwest National Laboratory, 2015.
Holladay, "Investigation of bypass fluid flow in an active magnetic regenerative liquefier," Cryogenics, May 19, 2018.
Holladay, Jamie, et al., "MagnetoCaloric Hydrogen Liquefaction", Project ID#: PD131 [online]. Pacific Northwest National Laboratory, 2018.
International Search Report and Written Opinion issued for International Application No. PCT/US2018/024668 on Jun. 20, 2018.
Janda et al., "Design of an active magnetic regenerative hydrogen liquefier," *Advances in Cryogenic Engineering*, vol. 37, 1992.
Lionte, "Adapting an active flow magnetic regenerator to a continuous fluid flow application," International Journal of Refrigeration, Oct. 16, 2017.
Non-Final Office Action issued by U.S. Patent and Trademark Office on Jan. 30, 2019 for U.S. Appl. No. 15/438,529.
Non-Final Office Action issued by U.S. Patent and Trademark Office on Nov. 25, 2019 for U.S. Appl. No. 16/563,692.
Non-Final Office Action issued by U.S. Patent and Trademark Office on Jun. 15, 2020 for U.S. Appl. No. 15/438,536.
Non-Final Office Action issued for U.S. Appl. No. 15/438,529 on Jan. 30, 2019.
Numazawa et al., "Magnetic refrigerator for hydrogen liquefaction," Cryogenics, Apr. 16, 2014.
Petitpas, Guillame and Simon, A.J., "Liquid Hydrogen Infrastructure Analysis", Project ID#: PD135 [online]. DOE Hydrogen and Fuel Cells Annual Merit Review, Washington, D.C., Jun. 6, 2017.
Rowe et al., "Ideal magnetocaloric effect for active magnetic regenerators," *J. Appl. Phys.*, 93(3): 1672-1676, Feb. 1, 2003.
Thomas, "Fuel cell and battery electric vehicles compared," *International Journal of Hydrogen Energy*, vol. 34, pp. 6005-6020, 2009.
U.S. Appl. No. 15/438,529, filed Feb. 21, 2017.
U.S. Appl. No. 15/937,773, filed Mar. 27, 2018.
U.S. Appl. No. 15/937,776, filed Mar. 27, 2018.
U.S. Appl. No. 16/563,692, filed Sep. 6, 2019.
Zhang et al., "Design optimization of a 0.1-ton/day active magnetic regenerative hydrogen liquefier," *Cryogenics*, 40(4-5): 269-278, Apr.-May 2000.

* cited by examiner

4 Stage AMRR with Bypass and LCNG Pre-Cooling for Liquefying Hydrogen

INTEGRATED REFUELING STATION

CROSS REFERENCE TO RELATED APPLICATION

This application is a divisional of U.S. application Ser. No. 15/438,536, filed Feb. 21, 2017, which claims the benefit of U.S. Provisional Application No. 62/298,356, filed Feb. 22, 2016, which is incorporated herein by reference in its entirety.

ACKNOWLEDGMENT OF GOVERNMENT SUPPORT

This invention was made with government support under Contract No. DE-AC05-76RL01830 awarded by U.S. Department of Energy. The government has certain rights in the invention.

BACKGROUND

The U.S. societal benefits of adopting light duty fuel-cell electric vehicles (FCEVs) are well known. FCEVs achieve about 65-70 miles per kg of hydrogen and require about 6 kg of hydrogen storage on board to provide about 400-mile range. On board storage can be provided by hydrogen compressed up to 700 bar or as liquid hydrogen at ~2 bar. Conventional multi-stage gas compression to make compressed $H_2$ ($CH_2$) at refueling stations is a typical method of making $CH_2$. Existing process equipment can be used to make $CH_2$ at about 875 bar and dispense it at 700 bar. Clean, dry $H_2$ gas ($GH_2$) feedstock nominally at about 20.7 bar (300 psia) can be made by steam-methane reformers, methane autoreformers, or water electrolyzers followed by purifier systems that remove impurities to low ppm levels. Multi-stage compressors with intercooling between 4 to 6 compression stages increase the pressure of $GH_2$ from about 20.7 bar to 875 bar. These commercial components are relatively expensive, require significant power, and are usually among the highest maintenance items at small-scale $CH_2$ refueling stations. It has been well established that liquid $H_2$ ($LH_2$) is a superior energy carrier compared to $GH_2$ or $CH_2$ because $LH_2$ has higher volumetric and gravimetric energy density. $LH_2$ is a cryogenic liquid that can be prepared using well-known liquefier processes such as $LN_2$ pre-cooled Claude cycle technology. Further, the specific energy to make $LH_2$ at standard conditions is the largest of any cryogenic liquid. The ideal rate of work input for a liquefier producing a certain rate of cryogen depends on the gas to be cooled and liquefied. $GH_2$ at 1 bar liquefies at ~20 K compared to ~111 K for pipeline natural gas (PNG) at 1 bar. Hydrogen liquefaction has the extra feature of removing the exothermal heat from ortho-to-para conversion as cooling occurs. The large difference in specific energy for liquefaction of $GH_2$ and PNG is illustrated by starting with pure $GH_2$ at 0.1013 MPa and 290 K which ideally requires 14,364 kJ/kg to make equilibrium $LH_2$. In contrast only 1,090 kJ/kg are required to liquefy methane (major component of PNG) from the same inlet conditions. The ratio of ideal liquefaction work to actual liquefaction work is defined as the Figure of Merit (FOM). Existing conventional large-scale liquefiers for $GH_2$ or PNG installed over the past several decades have maximum FOMs of about 0.35, i.e., it requires about 3 times more work input than the ideal minimum to make $LH_2$ or LNG. This liquefaction energy is about 30% of hydrogen's lower heating value while for LNG, only about 2% of methane's lower heating value. The combination of the largest specific energy of any cryogen, and low conventional-liquefier FOM are two major reasons why use of $LH_2$ as an on-board fuel for FCEVs has been avoided in favor of the default-choice of very high-pressure $CH_2$.

SUMMARY

Disclosed herein is a system that includes a liquid natural gas compression module having a compressed liquid natural gas conduit; an active magnetic regenerative refrigerator $H_2$ liquefier module; at least one $H_2$ gas source fluidly coupled to the active magnetic regenerative refrigerator $H_2$ liquefier module via an $H_2$ gas conduit; and a heat exchanger that receives the compressed liquid natural gas conduit and the $H_2$ gas conduit.

Also disclosed herein is a process that includes
pre-cooling a $H_2$ gas feedstock with a compressed liquid natural gas via a heat exchanger;
introducing the pre-cooled $H_2$ gas feedstock into an active magnetic regenerative refrigerator $H_2$ liquefier module; and
delivering liquid $H_2$ from the active magnetic regenerative refrigerator $H_2$ liquefier module to a liquid $H_2$ vehicle dispenser.

Further disclosed herein is a process that includes
pre-cooling a $H_2$ gas feedstock with a compressed liquid natural gas via a first heat exchanger;
introducing the pre-cooled $H_2$ gas feedstock into an active magnetic regenerative refrigerator $H_2$ liquefier module; and
delivering liquid $H_2$ from the active magnetic regenerative refrigerator $H_2$ liquefier module to a liquid hydrogen compression module and a second heat exchanger resulting in compressed hydrogen.

The foregoing will become more apparent from the following detailed description, which proceeds with reference to the accompanying figures.

DETAILED DESCRIPTION

Figure 1:
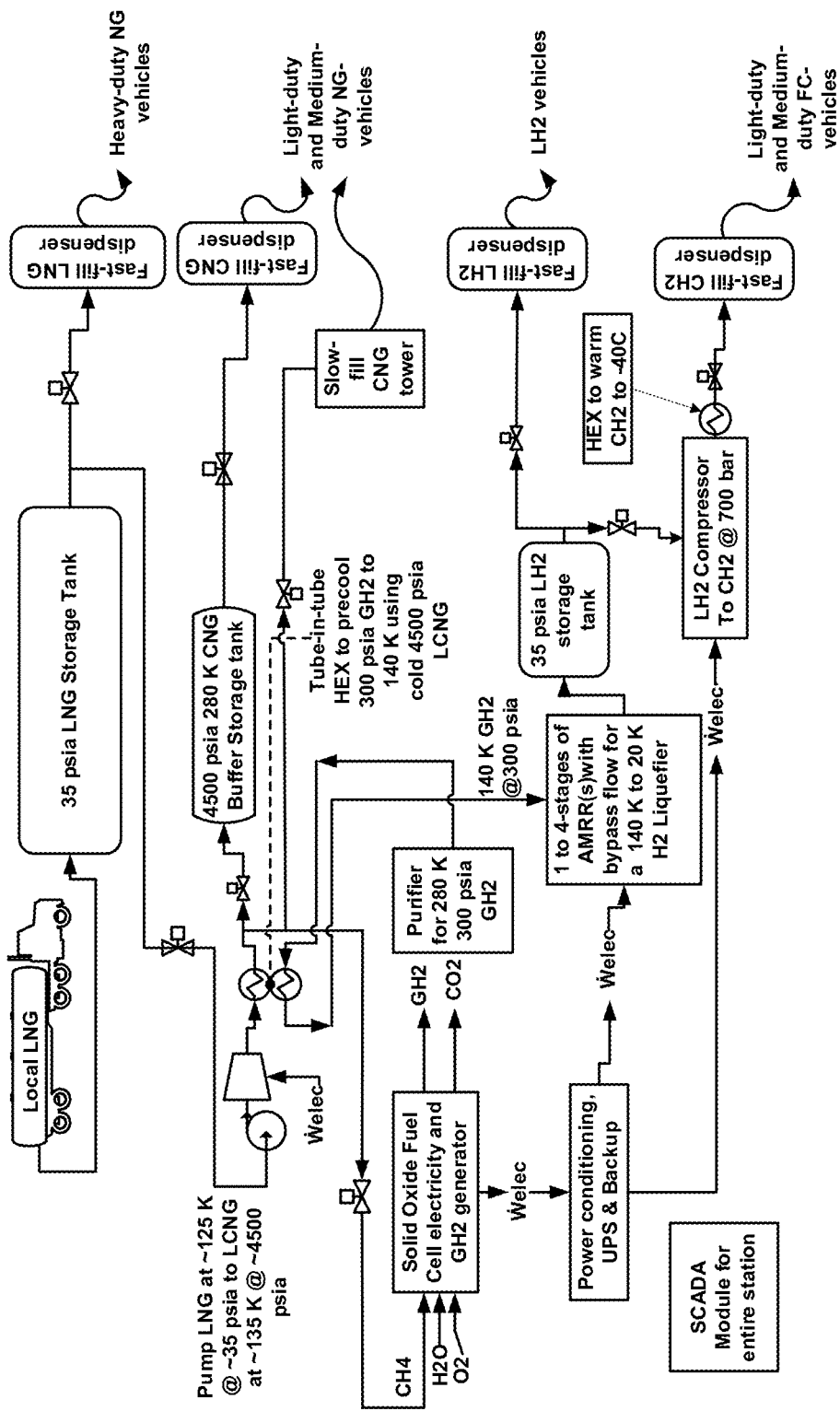
FIG. 1 is a block process flow diagram of an integrated vehicular refueling station for LNG, CNG, $LH_2$, and $CH_2$.

The challenges for increasingly faster transition to LNG/LCNG vehicular fuel use in the U.S. are much less than those for local supply and refueling infrastructure for FCEVs and other hydrogen-fueled vehicles. Understanding the challenges of existing $CH_2$ vehicular fuel deployment barriers reinforce the importance of a needed breakthrough in small refueling station designs that i) reduces specific energy for $LH_2$, ii) increases FOM of small-scale hydrogen liquefiers from ~0.25 to 0.60, iii) simultaneously reduces dispensed cost for $CH_2$ toward ultimate target of ~$2-4/kg, and iv) exploits the many potential energy and cost synergies that exist at refueling stations supplying LNG/LCNG/$LH_2$/$CH_2$. One energy synergy that leads to a major fuel price reduction is described herein.

Disclosed herein are refueling stations for vehicle fuels including liquid natural gas (LNG), compressed natural gas produced from LNG (LCNG), liquid hydrogen ($LH_2$), and compressed hydrogen ($CH_2$). Disclosed herein more particularly are processes and systems using about 240-300 bar LCNG to pre-cool low-pressure (~20 bar) gaseous hydrogen ($GH_2$) to about 140 K before using active magnetic regenerative refrigerators (AMRRs) to cool the $GH_2$ from about 140 K to about 20 K with an apparatus utilizing rotary wheels or reciprocating regenerators carrying layered ferromagnetic magnetic materials with Curie temperatures between about 150 K and about 50 K in high-performance regenerators. Each AMRR stage further utilizes opposite equivalent dual regenerators and bypass flow of a portion of cold helium heat transfer gas from a cold heat exchanger to further cool the LCNG-pre-cooled $GH_2$ stream to be liquefied. Also disclosed are processes and systems for converting $LH_2$ into $CH_2$ at about 850 bar for refueling vehicles at 700 bar.

Disclosed herein is a small-scale, inexpensive, modular refueling station that integrates several new, useful, and non-obvious features to simultaneously deliver 700-bar $CH_2$, ~2.7 bar $LH_2$, ~2.7 bar LNG, and ~240 bar CNG. This station could also deliver gasoline, propane and diesel fuel. This approach leverages direct comparisons among various fuel choices, especially if the $CO_2$ emitted per mile driven is factored into the excise tax/equivalent energy on each fuel at the dispensers.

If a small-scale $LH_2$/$CH_2$ vehicular refueling station is co-located with a LNG/LCNG vehicular refueling station, it is possible to use the "free and wasted" cold sensible heat from production of CNG from LNG at such refueling stations to pre-cool $GH_2$ process gas for liquefiers. Inexpensive, small-scale, hydrogen liquefiers with FOMs>0.6 can be made with several highly efficient active magnetic regenerative refrigerator (AMRR) stages spanning from 140 K to 20 K. Reduction of specific energy of liquefaction combined with highly efficient AMRR technology enables an integrated refueling station to dispense $CH_2$ or $LH_2$ fuels at a cost/mile-driven essentially equal to or less than gasoline.

This integrated LNG/LCNG/$LH_2$/$CH_2$ refueling station approach promises to be the most viable for introducing hydrogen as an energy carrier since it requires less capital investment for the smaller hydrogen volumes needed initially in the transition phase of the hydrogen economy. Pre-cooling 20.6 bar $GH_2$ at a refueling station that routinely makes LCNG from LNG reduces the specific liquefaction energy by about 60%. This is a huge impact and, when the pre-cooled $GH_2$ is coupled to efficient AMRRs to provide $LH_2$ for cold compression, offers a major price reduction in dispensed $CH_2$. The integration of disrupting technologies into a small refueling station capable of delivering 1,500 kg/day of $CH_2$ at $4/kg has not been previously achieved.

This system reinforces the huge thermodynamic benefit of using waste cold energy from another process and keeping approach temperatures between the $GH_2$ process stream and the cold helium bypass stream extremely low everywhere in the bypass heat exchanger as the $GH_2$ is cooled from 140 K to 20 K.

The innovative system to produce and deliver $LH_2$ and 700 bar temperature-compensated $CH_2$ for FCEVs at modified conventional LNG/LCNG refueling stations is illustrated in FIG. 1. This schematic shows the block process flow diagram (BPFD) for dispensing four vehicular fuels. The refueling station shown in FIG. 1 operates as follows. At about 100 existing and an increasing number of new LNG/LCNG stations, LNG is delivered in cryogenic tanker trucks with ~10,000 gallon/load capacity from local LNG plants with typical production rates of about 30,000 gpd to about 60,000 gpd. The LNG is stored in a well-insulated stationary LNG storage tank of nominally 25,000 to 50,000 gallons depending upon daily refueling demands at each refueling station. The LNG from the storage tank can be dispensed via cryogenic pumps or pressure transfers as LNG for heavy-duty vehicles (pump, vents, sensors and controls for LNG transfer are not shown on the BPFD).

The LNG is also used to make LCNG for light-duty and medium-duty vehicles by compressing a stream of LNG from the storage tank in an efficient cryogenic pump from ~35 psia to ~4500 psia. This efficient compression process warms the LNG from about 122 K to about 132 K before the cold compressed LNG stream is directed into an ambient air heat exchanger where the cold compressed LNG is warmed from about 132 K to about 280 K to make cool high-grade CNG that is stored in high-pressure cylinders at ~4,500 psia for temperature-compensated quick-fill dispensers of CNG fuel at ~3,600 psia. In conventional stations, the cold sensible heat in the compressed LNG is transferred to air and wasted. A novel feature disclosed herein is to use the wasted cold energy from the stream of LCNG at the refueling station to pre-cool a process stream of 300 psia $GH_2$ from ~290 K to ~140 K. The precooled $GH_2$ is feedstock for a multi-stage AMRRs in an efficient $LH_2$ liquefier with dual magnetic regenerators and bypass flows. These highly efficient AMRRs cover 140 K to 20 K to produce variable amounts of $LH_2$ depending upon demand at the particular refueling station. The $LH_2$ stored in a collection vessel inside the vacuum cold box of the liquefier is either dispensed as $LH_2$ fuel (e.g., for an ICE-vehicle with on-board $LH_2$~20-gallon storage tanks) or compressed to ~850 bar, warmed by using the cold sensible heat to cool thermal shields or other useful purposes. The $CH_2$ at room temperature is stored in very high-pressure insulated cylinders at ~850 bar to supply temperature-compensated quick-fill dispensers with 700 bar $CH_2$ fuel into FCEVs. During dispensing the $CH_2$ is cooled to −40° C. to prevent the vehicle storage tank from overheating during filling.

Other innovative features of this refueling station included in the BPFD are the use of internal reformation of boil-off methane in a high-temperature fuel cell to co-produce electrical power for the entire station as well as a stream of hydrogen feedstock. The $GH_2$ feedstock is at a pressure of about 300 psia. Impurities such as $H_2O$ and $CO_2$ are removed in a combined PSA/TSA purifier module using zeolite adsorbents that are highly selective for these two compounds and reduce their concentrations to about 1-20 ppm. The custom counterflow heat exchanger for pre-cooling the $GH_2$ may be a highly effective coil-wound tube in tube design capable of excellent heat exchange between $GH_2$ at 300 psia and LCNG at 4500 psia. Manufacturing techniques for such compact heat exchangers exist in the natural gas industry. The D.C. electrical power from the SOFC generator will be converted, conditioned, and distributed to various modules with power specs required for the various modules. This power module also has a UPS backup unit to provide power to critical modules such as the SCADA module, instrument air, and sensor panels in case loss of power occurs for any reason. This feature allows safe and controlled shut down of the entire refueling station. The operators use the SCADA system to monitor the entire facility and provide operational control from a control room under 24/7 supervision. The operators may be either on-site or at a central location nearby the refueling station and/or LNG plant. The $LH_2$ compressor module is much simpler and efficient than a room temperature $GH_2$ multi-stage compressor because it is polytropically compressing a cryogenic liquid, i.e. the density of temperature-compensated $CH_2$ at 850 bar is about 45 kg/m³ at ~245 K compared to about 70 kg/m³ for $LH_2$ at ~25 K.

Figure 2:
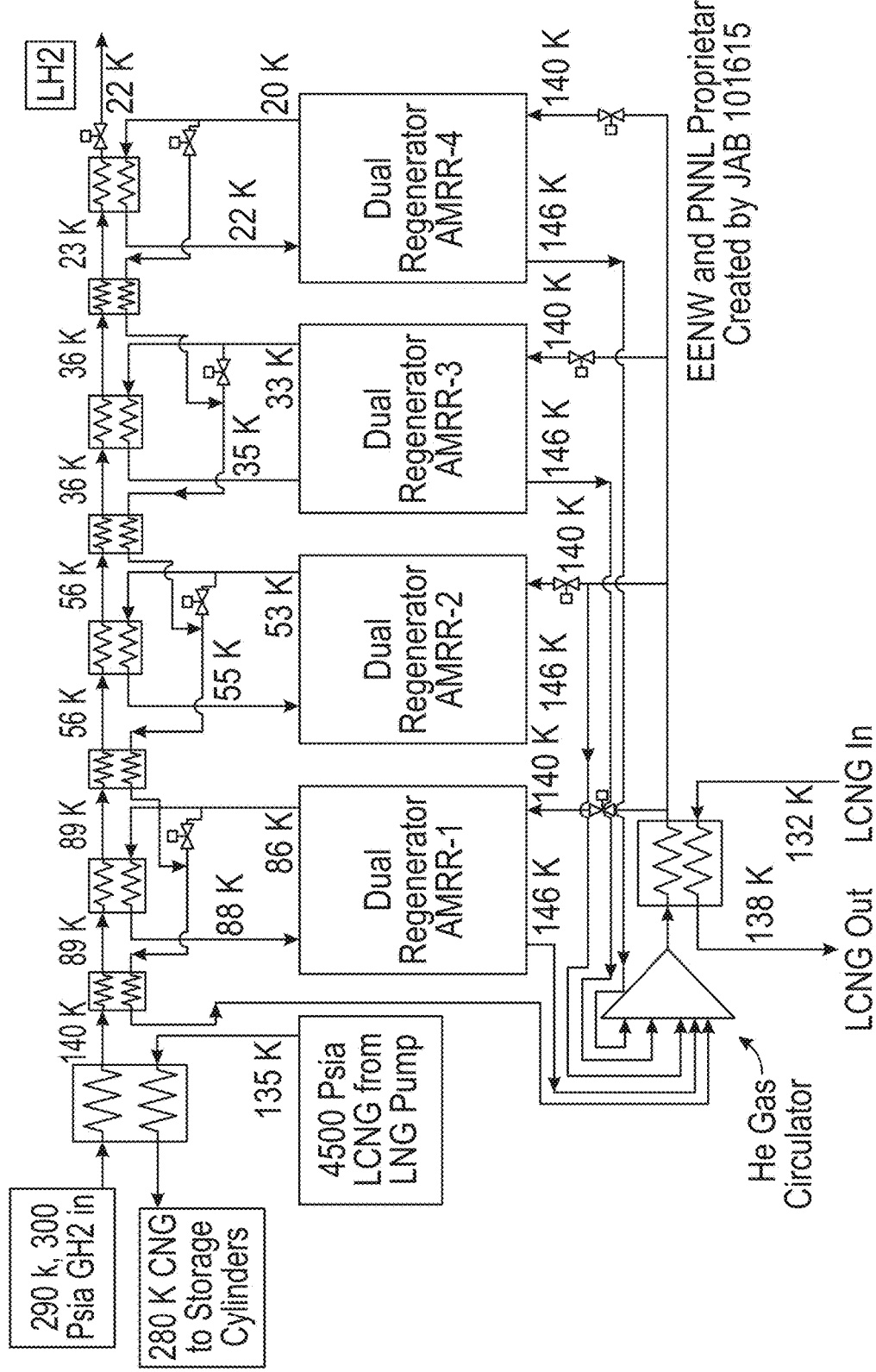
FIG. 2 is a block process flow diagram of a $LH_2$ liquefier with 4 AMRR-stages with bypass flow and liquid compressed natural gas pre-cooling.

FIG. 2 depicts an AMRL liquefier that spans from 140 K to 20 K. Four-AMRR stages with dual active magnetic regenerators and bypass flow efficiently convert the LCNG pre-cooled $GH_2$ into $LH_2$. The $GH_2$ process stream temperatures shown in this design indicate almost all of the process-stream cooling comes from bypass flow of helium heat transfer gas of each AMRR. The second heat exchanger at each AMRR stage with tiny temperature change across it illustrates the small inherent parasitic heat leaks in the CHEX between the dual magnetic regenerators of each AMRR stage. The bypass flow is a few percent (e.g, 5-10%, particularly less than 10%, more particularly 6%) of the primary heat transfer gas flow through the layered AMRs in the dual regenerator configuration. After passing through the heat exchangers of the coldest AMRR stage, the cold supercritical fluid $H_2$ at 300 psia passes through a J-T expansion valve where it is transferred as $LH_2$ at ~35 psia into a collection vessel. LCNG also is the common "hot" heat sink for each AMRR stage. This feature thermally decouples the AMRR stages from each other and reduces the number of components. Maximum use of four bypass heat-transfer gas streams reduces the temperature approaches for cooling/liquefaction of $GH_2$ that further increases the FOM. Integrating ortho-to-para catalysts into the bypass heat exchangers enable exothermal conversion at the highest possible temperature. This innovative AMRL design requires only one circulation pump for helium heat-transfer gas and for bypass gas circulation. The diagram shows four flow control valves to supply different amounts of helium gas for hot-to-cold flows in each AMRR stage. Each AMRR has layered regenerator segments on their respective rotary wheels or reciprocating dual regenerators in this parallel-stage liquefier configuration. Because each AMRR spans between 140 K and a different cold temperature, the number of magnetic refrigerants increases from ~two in the upper AMRR to ~six in the lowest AMRR. The warm end of all four regenerators has at least two layers of common magnetic materials. This feature will reduce the cost of fabrication of different layered regenerator designs. If each layer spans a maximum of ~20 K, only about six magnetic materials will be required for all AMRR stages. A drive motor rotates the dual regenerators of each AMRR stage through the AMR cycle and supplies the work required to pump the respective thermal loads from $T_{COLD}$ in each AMRR stage up to about 140 K. The means to enter this work into each AMRR stage are not shown in this diagram but are understood as required for a liquefier.

Numerous calculations were done to determine the energy and mass balances for the proposed AMRL design to enable revised cost estimates for this type of 1500 kg/day liquefier. The major results are:

The first significant result is reduction of specific energy for liquefaction of $GH_2$ at 300 psia. It drops from 7,115 kJ/kg for a 25 kg/day AMRL design starting at 280 K to 2,336 kJ/kg for the LCNG pre-cooled design starting at 140 K.

With $GH_2$ process gas entering the four-stage liquefier at 140 K, optimum AMRR stage cold temperatures are 89 K, 56 K, 36 K, and 23 K.

By using bypass flow from each AMRR stage to cool the process stream, the thermal loads at each AMRR stage cold temperatures are only estimated parasitic thermal loads of less than ~100 W per stage.

A selection of magnetic refrigerants is available for the lower-temperature AMRR stages starting at 140 K with cold temperatures given above that enable adiabatic temperature changes $\Delta T_{HOT}$=10.5 K and $\Delta T_{COLD}$=6.8 K with 7 T s/c magnets. These large adiabatic temperature changes increase the useful cooling power per kg of refrigerant.

Using bypass flow with sequentially colder helium gas, the magnetic refrigerants for all four AMRR stages of the LCNG pre-cooled AMRL are reduced from ~1500 kg in the 1,500 kg/day $LH_2$ magnetic liquefier design starting at 280 K to ~300 kg in the LCNG pre-cooled design with the same capacity of $LH_2$. The FOM expected is ~0.60 based on the preliminary design calculations.

The quantity of LNG required to provide pre-cooling via LCNG for a 1500 kg/day $LH_2$ plant is ~9,000 LNG gallons/day or ~6,200 GGE/day of CNG. This amount is available at larger LNG/LCNG refueling stations where the demand for 1,500 kg/day of $CH_2$ might co-exist.

This system establishes very low-cost $LH_2$ production on a much smaller scale than exists today. All of the $LH_2$ made at a LCNG refueling station supplied by LNG could economically supply $LH_2$ to several smaller (e.g., 150 kg/day) $CH_2$ refueling stations located nearby the 1,500 kg/day $LH_2$ plant.

In certain AMRR module embodiments described herein, the systems and processes can provide refrigeration between 20 K and 280 K with an apparatus utilizing rotary wheels or belts carrying regenerators comprised of layered ferromagnetic materials with Curie temperatures between 293 K and 50 K. The processes and systems further utilize bypass flow of a portion of cooled heat transfer fluid (e.g., a gas) to pre-cool a separate process stream to be liquefied.

To make a highly efficient liquefier for hydrogen or other process gases, several features should be used in its design. These features include:

Use an inherently efficient thermodynamic cycle;
Use an efficient work input device or mechanism;
Use an efficient work recovery device or mechanism;
Insure small temperature approaches for heat transfer between or among streams or between solids and streams;
Use high specific area and highly-effective regenerative and/or recuperative heat exchangers;
Keep pressure drops for heat transfer gas flows and process gas flow very low;
Invoke low longitudinal thermal conduction mechanisms via material and geometry choices;
Minimize frictional and parasitic heat leak mechanisms; and
Specifically for hydrogen, perform ortho-to-para conversion at the highest possible temperature during cooling in the process heat exchangers.

The processes and systems disclosed herein provide more efficient hydrogen liquefaction by integrating one or more AMRR stages (e.g., 2-4) with bypass flow to continuously cool a single hydrogen process stream to create a magneto-caloric hydrogen liquefier (MCHL) or active magnetic regenerative liquefier (AMRL) with much higher FOM than conventional liquefiers. In such AMRL designs rejection and absorption of heat are achieved by the temperature increase or decrease of magnetic refrigerants in regenerators upon isentropic magnetization or demagnetization combined with reciprocating flow of heat transfer gas. The cycle steps that magnetic refrigerants in an active magnetic regenerator (AMR) execute are: i) magnetize with no heat transfer gas flow; ii) cold-to-hot heat transfer gas flow at constant magnetic high field; iii) demagnetize with no heat transfer gas flow; and iv) hot-to-cold heat transfer flow at constant low or zero field. The AMR cycle of one or more refrigerants thermally connected by heat transfer fluid (e.g., a gas) in AMRR stages can be used to design excellent liquefiers whose potential for high performance comes from:

Reversible nature of magnetization-demagnetization steps in an AMR cycle at hertz frequencies for certain magnetic refrigerants. In contrast, it is inherently difficult to reversibly achieve high compression ratios, high throughput, and high efficiency in gas compression because of fundamentally poor thermal conductivity of low-density gases such as hydrogen or helium;

Naturally efficient work-recovery mechanisms, e.g., in rotary magnetic wheel or belt configurations large attractive magnetic forces on magnetic materials going into the high field region almost balance slightly larger attractive magnetic forces on identical but slightly colder magnetic materials coming out of the high field region. This is in contrast to limited gas-compression-work recovery by much-colder isentropic expanders in gas-cycle devices. To achieve highly efficient cycles the temperature of work input must be reasonably close to the temperature of work recovery for the entire liquefier temperature span, i.e., from near room temperature to ~20 K for hydrogen which can be done with good AMRR designs;

Efficient internal heat transfer between porous working refrigerant solids and flowing heat transfer fluids (e.g., a gas) in AMR cycles can maintain small temperature differences at all times during the cycle by using geometries with high specific areas such as ~10,000 $m^2/m^3$ in high-performance regenerators;

Efficient cooling of the hydrogen process gas and the AMRR heat transfer gas. This is a critical element of efficient liquefier design. The real work required to operate a single-stage AMRR (or any other type of single-stage refrigerator between 280 K and 20 K) as a hydrogen liquefier will be at least 4 times larger than the ideal work of hydrogen liquefaction. The huge impact on FOM of this single design feature illustrates the importance of reduction of approach temperatures in process heat exchangers in liquefiers of hydrogen and other gases such as helium, nitrogen, and natural gas. Conventional gas cycle liquefiers with only two to four heat exchanger stages inherently limit their FOM to about 0.50 before other real component inefficiencies are incorporated. Reducing the approach temperatures in process heat exchangers by using counterflowing bypass flow of a small percentage of heat transfer gas is a unique feature of AMRL designs to achieve a FOM greater than 0.5. The novel processes and systems disclosed herein substantially reduce the number of AMRR stages required for higher FOM as explained more fully below;

High energy density from use of solid refrigerants in compact regenerative beds can become high power densities with AMR cycles at hertz frequencies; and Safe, reliable, durable, compact, and cost-effective devices.

The above-explained desired features can be achieved by incorporating into the systems and processes at least one, and preferably a combination, of the following inventive aspects disclosed herein:

Continuous bypass flow to continuously pre-cool the process gas stream. The bypass gas flow is determined by the amount necessary to completely pre-cool the process gas stream while maintaining small 1-2 K temperature approaches between bypass gas and process gas;

The heat capacity of the magnetic refrigerant changes with the magnetic field, especially in the temperature region from the Curie temperature to ~25-30 K lower. Therefore, the thermal mass, or heat capacity multiplied by the refrigerant mass, will also vary. To take advantage of this phenomena unique to magnetic refrigeration the mass flow rate of heat transfer gas in the hot to cold flow region of the magnetic wheel must be several percent larger than the mass flow rate of heat transfer gas in the cold to hot flow region of the same wheel to balance (i.e., equivalent or close to the same) the different thermal mass of the magnetic refrigerant below their Curie temperatures in high and low magnetic field;

The temperature difference between the bypass heat transfer first cold inlet temperature and the process gas first cold exit temperature is 1 to 5 K, more particularly 1 to 2 K;

The magnetic refrigerant operates at or below its Curie temperature throughout an entire active magnetic regeneration cycle because this is the region where the difference of thermal mass between magnetized and demagnetized magnetic refrigerants is maximized; and/or The sensible heat of the process gas is entirely removed by the bypass flow heat exchanger.

Certain embodiments of the novel processes and systems include the use of two dual rotary sets of identical rotary active magnetic regenerators with pressurized helium as a circulating common heat transfer gas to continuously and simultaneously execute the 4-steps of the AMR cycles at different sections of rotating AMRR; i.e. as several regenerators are magnetized in the high magnetic field region of a rotary AMRR, several others are demagnetized in the low-magnetic field region. The regenerators of the rotary configuration in the two magnetic field regions are oriented opposite to each other such that circulating helium heat transfer gas flows from hot-to-cold temperatures in the demagnetized regenerators and simultaneously from cold-to-hot temperatures in the magnetized regenerators. For example, several identical regenerators attached to a belt, chain or wheel rim are magnetized simultaneously while another equal number of identical regenerators are demagnetized. Similarly, the heat transfer gas is causing the hot-to-cold flow in several demagnetized regenerators at the same time as heat transfer gas in an opposite part of the rotational path is causing the cold-to-hot flow in several magnetized regenerators. The "several" regenerators executing the different steps of the AMR cycle comprise the "set".

Each regenerator in a given 'set' executing one of the steps of the AMR cycle has an identical regenerator in the 'set' executing the other three steps of the AMR cycle. In this instance, there are several "dual" regenerators comprised of any two regenerators executing the opposite step in the AMR cycle. The rotary regenerators in the high and low field regions may be separated by a cold heat exchanger where the small parasitic heat leak is continuously absorbed and several percent of the cold heat transfer gas from the hot-to-cold flow out of the demagnetized regenerator is sent into the bypass flow heat exchanger before the remaining heat transfer gas enters the magnetized regenerator for the cold-to-hot flow (see FIGS. 1 and 2). Thus, the rotary geometry allows the four AMR cycle steps to exist simultaneously because at a given point in time, each of the AMR cycle step is occurring in a portion of the AMRR stage.

The embodiments of the novel processes and systems described herein utilize the difference between thermal mass of ferromagnetic refrigerants below their Curie temperatures when magnetized and demagnetized to enable use of bypass flow. The amount of bypass flow results from the additional heat transfer gas required to change demagnetized refrigerant temperatures through a regenerator in the hot-to-cold flow step of the AMR cycle over the heat transfer gas required to change magnetized refrigerant temperatures through its dual magnetized regenerator in the cold-to-hot flow step of the AMR cycle. The larger the difference in thermal mass, the larger the amount of bypass flow required in an optimized AMRR. Because the thermal difference increases with difference in magnetic field during the AMR cycle, the highest practical magnetic field changes from high field regions at 6-8 T to low field regions at 0 to 0.3 T, preferably a value such as, for example, 7 T to 0.3 T are desired. Maximum utilization of this feature is accomplished by operating each ferromagnetic refrigerant below its Curie temperature throughout its entire AMR cycle which requires maintaining the average $T_{HOT}$ of each refrigerant during its AMR cycle at least $\Delta T_{HOT}$ below its respective Curie temperature. Further, because the magnetic field-dependent thermal mass difference also decreases monotonically as the temperature of each magnetic refrigerant decreases below its respective Curie temperature in the regenerator, the average temperature difference between average $T_{HOT}$ and average $T_{COLD}$ of each layer of magnetic material within a regenerator of an AMRR stage is chosen to be about 20 K. In certain embodiments, the operating temperature span (average $T_{HOT}$–average $T_{COLD}$) of each refrigerant in the AMRRs is chosen to be ~20-30 K to maximize difference in thermal mass of the ferromagnetic refrigerants to maximize the possible bypass flow rate. Further, over the 20-30 K temperature span below the Curie temperature the adiabatic temperature change of each magnetic refrigerant for a given magnetic field change decreases with temperature to closely match the $2^{nd}$ law of thermodynamics requirements of highly efficient thermodynamic refrigeration cycles, i.e. $\Delta T_{COLD} = \Delta T_{HOT} * T_{COLD}/T_{HOT}$.

The helium bypass gas flow rate for each AMRR stage is calculated from complete enthalpy balance between that of the desired hydrogen process gas flow rate for a particular AMRL liquefaction rate, e.g. kg/day, and the enthalpy of the helium bypass gas flow rate in the counterflow bypass-gas to process-gas micro-channel or other highly-effective heat exchanger. This novel feature enables the sensible and/or latent heats of the hydrogen gas to be continuously and entirely removed by the warming helium bypass gas rather than in each cold heat exchanger (CHEX) of AMRR stages of the liquefier. The only remaining thermal load in each CHEX is from small parasitic heat leaks, very small process stream loads due to residual temperature approaches in real process heat exchangers, and rejected thermal energy from the hot side of the next colder AMRR stage in a series configuration of a hydrogen liquefier (See FIG. 4). Use of this design feature applies no matter what hydrogen process stream flow rate is desired, i.e., the helium gas bypass flow rate is simply increased to completely cool the hydrogen process stream to within 1-2 K of the coldest temperature of the particular AMRR stage being considered. For example, the hydrogen process stream can be cooled to the bubble point temperature for a specified pressure (e.g., ~20 K for $LH_2$ at 0.1013 MPa). The average $T_{COLD}$ of the coldest AMRR stage will be 1-2 K below the $LH_2$ temperature. The variable in this design procedure is the helium bypass flow; as it increases with increasing $LH_2$ liquefaction, the helium heat transfer flow through the magnetic regenerators increases which in turn increases with the size of the AMRR stages.

In this design procedure, the helium bypass flow rate is determined by the AMRL hydrogen liquefaction rate. In turn, the helium bypass gas flow rate is an optimum small fraction of the helium heat transfer gas flow rate for the AMRR stage. The heat transfer gas flow rate is directly coupled to the detailed design variables of the AMRR including the number and mass of magnetic refrigerants, adiabatic temperature changes, magnetic field change, heat capacity of the refrigerants, the cycle frequency, and temperature profile from $T_{HOT}$ to $T_{COLD}$ within the regenerator that determines the fraction of the active magnetic regenerator that cools below the average $T_{COLD}$ each cycle. With an optimum hot-to-cold flow rate of helium heat transfer gas through the active magnetic regenerators the average cooling power of the demagnetized regenerator (using Gd as an example of an excellent magnetic refrigerant) is given by:

$$\dot{Q}_{Gd}(T_{COLD}) = \nu Fr_{COLD} M_{Gd} C_{Gd}(T_{COLD}, B_{0.6T}) \Delta T_{CD} (T_{COLD})$$

where $\dot{Q}_{Gd}(T_{COLD})$ is the cooling power in W, $\nu$ is the AMR cycle frequency in Hz, $Fr_{COLD}$ is a blow-averaged dimensionless fraction of the regenerator that is colder than the average $T_{COLD}$ of the demagnetized regenerator before the hot-to-cold blow of the helium heat transfer gas, $M_{GD}$ is the mass of Gd in a flow sector of the rotary wheel regenerator in kg, $C_{Gd}$ is the total heat capacity of Gd at $T_{COLD}$, and the low magnetic field after demagnetization in J/kg K, $\Delta T_{CD}$, is the adiabatic temperature change upon demagnetization from high field to low field in K. All the variables in this equation are known except $Fr_{COLD}$. This parameter depends on the axial temperature profile of an AMR that depends upon the cold thermal load, the heat transfer gas flow rate, and the percentage of bypass flow. Numerical simulation of axial temperature profiles for magnetic regenerators as a function of bypass flow of helium heat transfer gas can be predicted by solving the partial differential equations that describe AMR performance. A linear temperature profile is a good approximation for optimum helium heat transfer gas and percentage bypass flow. Experiments confirm the numerical predictions that 3-12% bypass is the typical range depending upon the magnetic refrigerant and magnetic field changes. The helium heat transfer gas flow rate is given by dividing the cooling power of the regenerator by the heat capacity of helium at constant pressure times $\Delta T_{CD}/2$ in kg/s.

Certain embodiments of the novel processes and systems have bypass flow of a few percent of cold helium gas (e.g., 3 to 12% of the total heat transfer gas in the hot-to-cold flow through the demagnetized regenerator, more particularly 6%) to continuously pre-cool the hydrogen process stream thus reducing the number of AMRR stages in an efficient $H_2$ liquefier from 6-8 stages without bypass flow to 3-4 stages with bypass flow. It is obvious fewer AMRR stages using bypass flow to continuously pre-cool the hydrogen process stream will also require substantially less magnetic refrigerant for an equivalent liquefaction rate. Continuous cooling of the hydrogen process stream in a liquefier essentially eliminates a very large source of irreversible entropy generation and thereby increases the FOM of the liquefier significantly. From this description it is apparent that the flow rate of bypass heat transfer gas is determined by complete removal of the sensible and latent heats from the process stream which in turn determines the total helium heat transfer flow rate for the AMRR stage given the percentage of bypass flow allowed by the thermal mass differences in the magnetic regenerator which in turn determines the mass of the magnetic regenerator given the $\Delta T_{COLD}$ from the magnetocaloric effect. This novel design process minimizes the number of AMRR stages and mass of magnetic refrigerants in liquefiers for hydrogen and other gases.

Certain embodiments of the novel processes and systems use layered active magnetic regenerators for enabling larger differences between the average temperatures $T_{HOT}$ and $T_{COLD}$ necessary to use fewer stages in the new hydrogen liquefier design. The magnetic regenerators are fabricated with multiple longitudinally or radially-layered magnetic refrigerants located such that the Curie temperature of each refrigerant is above the average AMR-cycle hot temperature $T_{HOT}$ by $\Delta T_{HOT}$ at that axial location in the regenerators in steady-state operation to maximize thermal mass differences and thereby percentage of bypass flow. All the refrigerants in the AMRR individually execute small magnetic Brayton cycles as they are alternately magnetized and demagnetized by the magnetic field and connected together from $T_{HOT}$ to $T_{COLD}$ by the flowing helium heat transfer gas. This coupling allows the overall temperature span of an AMRR to be many times adiabatic temperature changes from the magnetocaloric effect of each magnetic refrigerant. The thermomagnetic properties of properly layered refrigerants must simultaneously have entropy flows that satisfy the 2nd law of thermodynamics with allowance for generation of irreversible entropy and effects of bypass flows.

An AMR cycle has four steps: magnetization of one set of active magnetic regenerators in the rim of the wheel in FIG. 1 of the same stage without flow of heat transfer fluid; flow of heat transfer fluid from cold-to-hot through the magnetized beds; demagnetization of this same set of beds while there is no flow of heat transfer fluid; and flow of heat transfer fluid from hot-to-cold through the demagnetized beds. FIG. 1 illustrates that four sets of layered regenerators in the rim of the wheel in the AMRR stage undergo the four steps of the AMR cycle, but 180 degrees out of phase with a similar set of regenerator beds. After the active magnetic regenerators (AMR) in the rim of the wheel in FIG. 3 have executed several hundred cycles, i.e. in 10-15 minutes, the layered active magnetic regenerators in the rim of the wheel in FIG. 1 will have an average dynamic temperature gradient from $T_{HOT}$ to $T_{COLD}$ along the flow axis of the active magnetic regenerators, i.e., in the radial direction through the rim of the wheel in FIG. 3.

The magnetic refrigerants in the AMR beds have a difference in thermal mass which is the product of heat capacity per unit mass times the mass of magnetic refrigerant (or just heat capacity in this case because the mass of magnetic material in a magnetic regenerator doesn't depend upon temperature or magnetic field). The heat capacity of a ferromagnetic material below the Curie temperature (ordering temperature) is smaller in higher magnetic fields than at lower or zero magnetic fields. However, this difference switches at the Curie temperature because the heat capacity in higher magnetic fields decreases slowly as the temperature increases while the heat capacity in low or zero fields drops sharply at the Curie temperature such that the heat capacity at higher fields becomes larger than the heat capacity in lower or zero magnetic fields. This means the difference in thermal mass between a magnetized AMR bed and a demagnetized AMR bed changes sign at the Curie temperature and the net difference in thermal mass for an AMR cycle spanning across the Curie temperature rapidly decreases with increasing temperature. Therefore, the optimal amount of diverted or bypass flow for an AMR cycle that extends above the Curie temperature will rapidly decrease to zero. Simultaneously an AMR cycle operated this way will become less efficient due to increased intrinsic entropy generation in such an AMR cycle and due to insufficient bypass flow to pre-cool the same amount of hydrogen process gas. In the design of the novel processes and systems disclosed the importance of selecting and controlling the hot sink temperature and temperature span to maximize the difference in thermal mass (and thereby the amounts of bypass flow) is recognized. First, the dynamic $T_{HOT}$ is always $\Delta T_{HOT}$ less than the Curie temperature of the magnetic refrigerant at the hot end of the regenerator (, i.e., the outer-most refrigerant in the layered rim of the wheel in FIG. 1) at its maximum during the magnetization step of the AMR cycle. $T_{HOT}$ is the environmental temperature where the heat is dumped. The dynamic $T_{HOT}$ is the increase in temperature caused by inserting the regenerator into the magnetic field. The maximum dynamic $T_{HOT}$ depends on where it is in the cycle, but generally the maximum is $T_{HOT}+\Delta T_{HOT}$. This can be done by setting a fixed heat sink temperature to anchor $T_H$ which in turn yields the largest difference in thermal mass between high and low magnetic fields. The second aspect of the difference in thermal mass in high and low magnetic fields is that it decreases steadily as the cold temperatures in the regenerator decrease below the Curie temperature (s) of the magnetic refrigerants. Hence, the magnetic materials in an AMR bed must operate in temperature spans when magnetized of $T_H+\Delta T_{HOT} \leq T_{curie}$ and $T_C+\Delta T_{COLD}$ equal to ~20 K<$T_{Curie}$ and when demagnetized, between $T_H-\Delta T_{HOT}$ and $T_C-\Delta T_{COLD}$ which are ~20 K apart. $T_C$ represents cold temperatures of a slice of magnetic regenerator at any point in the AMR as it executes its tiny magnetic Brayton cycle. $\Delta T_{COLD}$ represents the temperature drop caused by the magnetocaloric effect when the regenerator is removed from the magnetic field. If larger temperature spans with optimum differences in thermal mass are desired (as required for very high FOM), layers of magnetic materials with descending Curie temperatures must be used in the AMR bed.

Figure 3:
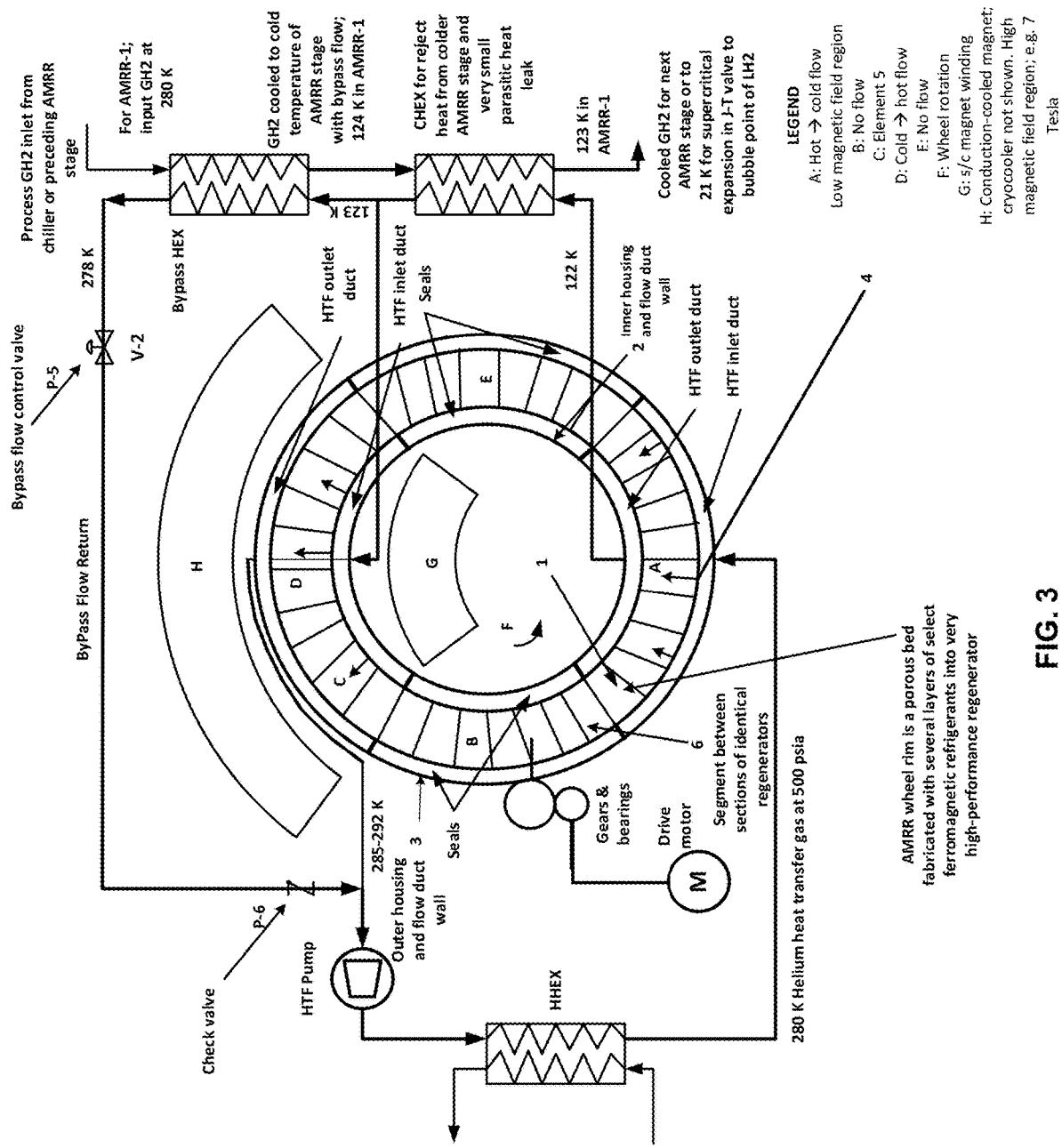
FIG. 3 is a schematic diagram of a cross-section of a rotary wheel embodiment of a single-stage active magnetic regenerative refrigerator (AMRR) with bypass flow. For example, the embodiment shown in FIG. 1 is a schematic diagram of a single stage AMRR with layered magnetic materials and bypass flow of heat transfer fluid to continuously cool a process stream such as gaseous $H_2$ (GH2) or natural gas. In this stage there are eight magnetic materials to span from ~280 K to ~122 K. This design also works for 122 K to 53 K or from 53 K to 22 K; each with fewer layers of refrigerants and less material as required for a $LH_2$ liquefier.
Figure 4:
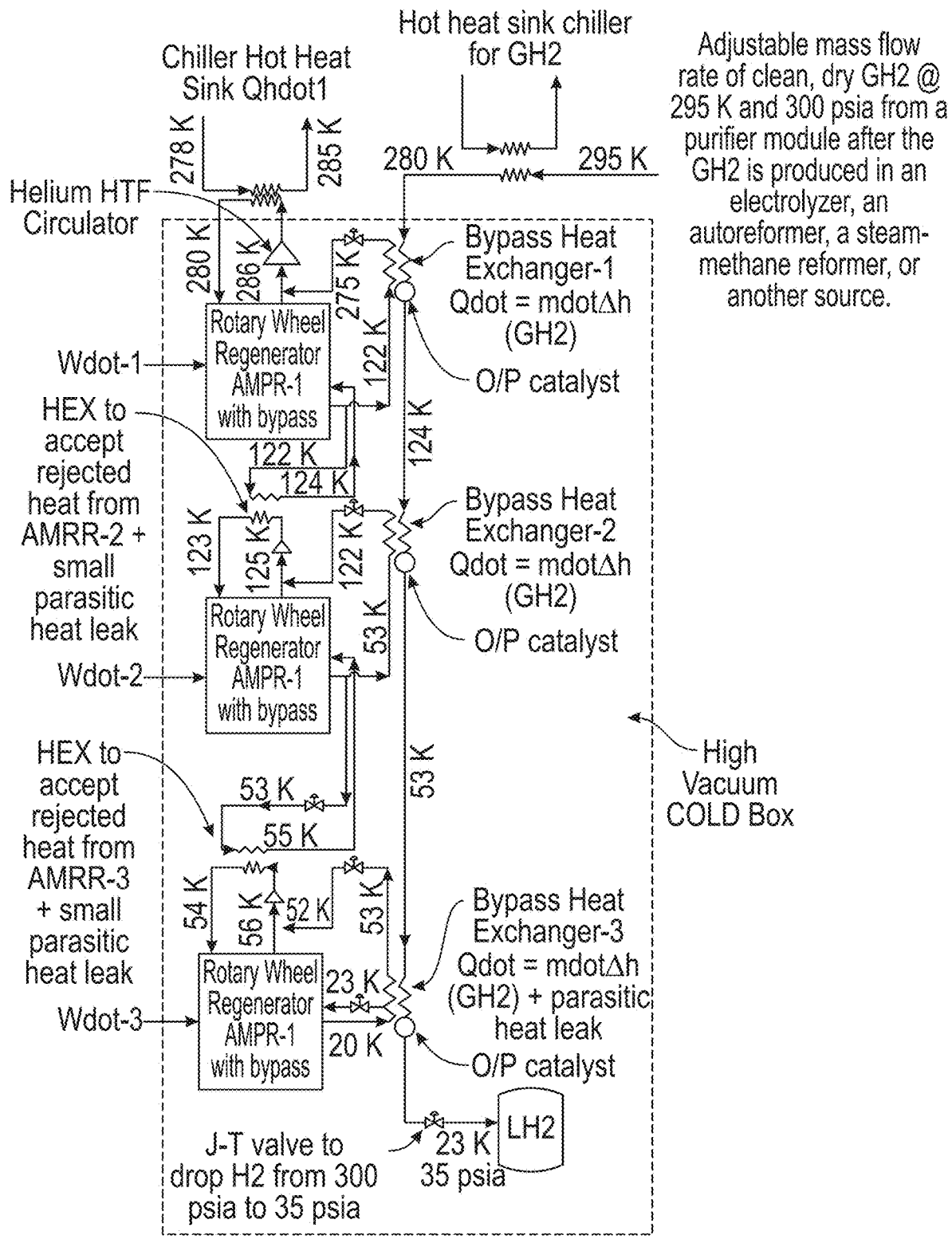
FIG. 4 is a schematic of a 3 AMRR-stages with continuous bypass flow in a series configuration as a $H_2$ liquefier.

For example, Gd metal is an excellent ferromagnetic refrigerant that has a Curie temperature of about 293 K. With ~6.5-Tesla magnetic field changes [6.8 T to 0.3 T], the adiabatic temperature change $\Delta T_{HOT}$ is about 12-13 K so we maintain $T_{HOT}$ to be 280 K so the maximum temperature during its AMR cycle is 280 K+12 K or 292 K. This temperature is indicated in FIG. 3 and FIG. 4. The hot heat sink temperature is shown as 278 K-280 K in FIGS. 1 and 2. During a complete rotation of the wheel in FIG. 3, Gd will be other outermost layer of refrigerant in the rim-shaped layered regenerator and its temperature will change from ~292-293 K just as it enters the high field region and drop to ~280 K as it leaves the high field region and drop further to ~270 K as it enters the low/zero field region and increases to ~280 K as it leaves the low/zero field region and then increase to ~293 K as it enters the high field region again. The average of the Gd temperature as it rotates is ~280 K which is the average $T_{HOT}$ of the AMRR stage. A similar shaped dynamic temperature cycle is executed by different layers within the wheel. The temperature span is the difference between the average $T_{HOT}$ and the average $T_{COLD}$. In the AMRR stage shown in FIG. 3 the temperature span is 122 K to 280 K. Other AMRR stages in a multi-stage liquefier will have different spans as indicated in FIG. 2.

For each layer of magnetic refrigerant, the value of $T_H$ is the average of the dynamic temperature at the edge of the layer in the rim of the wheel illustrated in FIG. 3. It varies through a layered regenerator and can be measured by a tiny temperature sensor (such as a thermocouple) inserted into the regenerator during rotation of the wheel that will show the small local magnetic Brayton cycle or AMR cycle.

As described above, a portion of the cold heat transfer fluid from each AMRR stage is returned to the hot heat sink via bypass flow. Each stage of the rotary embodiments of an AMRR has sets of dual AMRs for continuous bypass flow to the process heat exchanger during all steps of the AMR cycle with each AMRR stage sized to ensure the bypass flow from each stage completely cools the process gas (hydrogen) to the cold temperature of the respective stage. This is a powerful design feature because it allows the approach temperatures between the counter-flowing helium bypass flow and the 'equilibrium' hydrogen gas in the process heat exchanger with embedded ortho-para catalysts to be 1-2 K or less at all times. The phrase "approach temperature" refers to the temperature difference between the helium bypass flow and hydrogen gas in the process heat exchanger at the bypass gas flow entrance of the bypass heat exchanger.

Illustrative embodiments of the AMRR stages are rotary designs with sets of dual regenerators that are simultaneously executing the four steps of the AMR cycle at all times during the rotational cycle of 0.5 to 1 Hertz. One embodiment shown, for example, in FIG. 3, has four different regions in the rotary design allows continuous flow of the heat transfer gas through some demagnetized regenerator beds (the identical regenerators in the low/zero field region) and some magnetized regenerator beds (the identical regenerators in the high field region) and no flow through the regions where the magnetic field is either increasing or decreasing. The bypass heat transfer fluid flow is continuously sent to the process heat exchanger from the cold heat transfer fluid flowing out of the cold duct in the low field region into the cold duct in the high field region to maintain steady-state flow and thus the very small 1 to 5 K, more particularly 1-2 K, approach temperatures at all times and locations in the process heat exchanger. A major improvement is that the use of bypass flow of only a few percent of cold helium gas to pre-cool the hydrogen process stream reduces the number of AMRR refrigeration stages in an efficient $H_2$ liquefier from 6 to 3 or 4.

Good magnetic refrigerants have large magnetic moments to provide maximum entropy change from changes in magnetic field. The accompanying magnetocaloric effect of a good material is confined to a finite temperature range around its magnetic ordering temperature where the magnetic entropy is strongly temperature and field dependent. To take maximum advantage of bypass flow it is important to maximize the difference between the high-field and low-field thermal mass of magnetic refrigerants. The thermo-magnetic properties of the refrigerants must simultaneously satisfy numerous other criteria such as: i) satisfying the adiabatic temperature changes as a function of temperature to satisfy the 2nd law of thermodynamics and ii) allowance for inevitable creation of some irreversible entropy even in the best optimized regenerator designs.

Gadolinium is an excellent magnetic refrigerant and has been generally accepted as the reference material against which other refrigerants are compared. It has a simple ferromagnetic ordering temperature of ~292 K and exhibits an adiabatic temperature change of ~2 K/Tesla over practical magnetic field strengths (up to ~8 T). It also has a large difference in field-dependent thermal mass just below its Curie temperature. Introduction of alloying additions of another lanthanide metal reduces the magnetic-ordering temperature of Gd without much effect on the total magnetic moment per unit volume and the change in magnetization with temperature near a sharp ordering temperature.

Homogeneous alloys of Gd with other rare earth metals (Tb, Er, Dy, Ho) or Y make superior magnetic refrigerants as well. Other potential rare earth elemental refrigerants such as Ho and Er have more complex magnetic ordering phenomenon but when alloyed with Gd these effects tend to be reduced at high magnetic fields. The addition of non-magnetic Y to Gd reduces the adiabatic temperature change of Gd gradually but simultaneously decreases the magnetic ordering temperature so the simple ferromagnetism of Gd is preserved down to about 200 K.

Key features or suitable refrigerant materials include:
Use ferromagnetic materials that operate below their Curie temperature throughout their entire AMR cycle;
Maintain average $T_{HOT}$ at least $\Delta T_{HOT}$ below the Curie temperature of the uppermost layer of magnetic material in a regenerator; this applies to each layer of magnetic material in the regenerator with correspondingly lower cycle temperatures;
Average temperature difference between $T_{HOT}$ and $T_{COLD}$ should be ~20 K per layer of magnetic refrigerant;
Spanning from 280 K to 120 K in one AMRR stage requires 8 refrigerants to be combined into optimally layered regenerators.
Layering must have smooth flows of energy and entropy at transitions between layered refrigerants along the longitudinal axis of the regenerator.

Illustrative magnetic refrigerants include those shown below in Table 1.

| Material | Operating Temperature Span K | Ordering Temperature K |
|---|---|---|
| Gd | 280-260 | 293 |
| $Gd_{0.90}Y_{0.10}$ | 260-240 | 274 |
| $Gd_{0.30}Tb_{0.70}$ | 240-220 | 253 |
| $Gd_{0.69}Er_{0.31}$ | 220-200 | 232 |
| $Gd_{0.02}Tb_{0.98}$ | 220-200 | 233 |
| $Gd_{0.32}Dy_{0.68}$ | 200-180 | 213 |
| $Gd_{0.66}Y_{0.34}$ | 200-180 | 213 |
| $Gd_{0.39}Ho_{0.61}$ | 180-160 | 193 |
| $Gd_{0.59}Y_{0.41}$ | 180-160 | 193 |
| $Gd_{0.15}Dy_{0.85}$ | 180-160 | 193 |
| $Gd_{0.42}Er_{0.58}$ | 160-140 | 173 |
| $Gd_{0.27}Ho_{0.73}$ | 160-140 | 173 |
| $Gd_{0.16}Ho_{0.84}$ | 140-120 | 153 |
| $Gd_{0.34}Er_{0.66}$ | 140-120 | 152 |
| $Gd_{0.23}Er_{0.77}$ | 120-100 | 132 |
| $(Ho_{0.80}Gd_{0.20})Co_2$ | 120-100 | 130 |

Illustrative ortho $H_2$ to para $H_2$ catalysts for use in the bypass flow process heat exchangers include, but are not limited to, activated carbon; ferric oxide ($Fe_2O_3$); chromic oxides ($Cr_2O_3$ or $CrO_3$); Ni metal and Ni compounds ($Ni^{2+}$); rare earth metals and oxides such as $Gd_2O_3$, $Nd_2O_3$, and $Ce_2O_3$; Pt; and Ru. Activated carbon and ferric oxide are particularly preferred. The catalysts may be employed in low concentrations on alumina or similar substrates and placed directly into the hydrogen process stream either in or near the process heat exchangers.

In certain embodiments the catalyst may be incorporated into a micro-channel or tube-in-tube $GH_2$ process heat exchangers in counterflow with the cold helium bypass flows from the AMRR stage(s) to maintain 'equilibrium' hydrogen continuously as the hydrogen is cooled. This continuously removes the exothermic heat of conversion at the highest possible temperatures necessary to maintain very high FOM in the overall liquefier. Thus, certain embodiments of the novel processes and systems can provide a FOM of at least 0.6, more particularly at least 0.7, and most particularly at least 0.75.

The rotary AMRR apparatus includes an annular bed 1 of at least one porous magnetic refrigerant material. As shown in FIG. 3, the rotary AMRR apparatus is divided into four sections (listed in order of wheel rotation): (i) a high magnetic field section in which the heat transfer gas flows from a cold side to a hot side through the magnetized bed(s), (ii) a first no heat transfer gas flow section in which the bed(s) are demagnetized, (iii) a low magnetic or demagnetized field section in which the heat transfer gas flows from a hot side to a cold side through the demagnetized bed(s), and (iv) a second no heat transfer gas flow section in which the bed(s) are magnetized. Seals are provided in the no heat transfer gas flow sections to prevent the heat transfer gas flow. The magnetic refrigerant bed may be divided into compartments 6 wherein the compartments may include differing magnetic refrigerants relative to other compartments.

The rotary AMRR apparatus includes a rotating wheel that includes an inside hollow annular rim 2 (inner housing and flow duct wall) and an outside hollow annular rim 3 (outer housing and flow duct wall). A hot heat transfer fluid (HTF) (e.g., helium gas) is introduced into the outside rim 3 of the rotary AMRR apparatus via an HTF inlet duct provided in the low magnetic or demagnetized field section (iii). The hot HTF in the outside rim 3 has a steady-state circumferentially average temperature that, for example, may be 280-285 K. However, the local temperature at a given time and location in the AMR cycle may differ from the steady-state circumferentially average temperature. The hot HTF flows in a radial direction through the low magnetic or demagnetized bed, cooling the HTF. The cooled heat transfer fluid exits the low magnetic or demagnetized field section (iii) via an HTF outlet duct and into the inside rim 2. The HTF radial flow is shown by the arrows 4 in the low magnetic or demagnetized field section (iii). The cold HTF in the inside rim 2 has a steady-state circumferentially average temperature that, for example, may be 125-130 K. However, the local temperature at a given time and location in the AMR cycle may differ from the steady-state circumferentially average temperature. The inside rim 2 is fluidly coupled via an HTF outlet duct and a conduit to an inlet of a cold heat exchanger (CHEX). The CHEX is for the reject heat from a colder AMRR stage and for very small parasitic heat leaks. As can be seen the approach temperature differential in the CHEX is 1 K.

The heat transfer fluid exits the CHEX and into a T-junction in which a portion of the heat transfer fluid bypasses the high magnetic field section (i) and instead is directed to an inlet of a bypass gas heat exchanger. The flow at the T-junction may be controlled a bypass flow control valve. In certain embodiments, 3-12%, particularly less than 12%, more particularly less than 8%, and most particularly 6%, of the heat transfer fluid is diverted to the bypass gas heat exchanger. The remaining heat transfer fluid is introduced as the cold flow into the inside rim 2 at the high magnetic field section (i) via an HTF inlet duct.

The cold HTF flows in a radial direction through the high magnetized bed, heating the HTF. The hot HTF exits the high magnetic field section (i) via an HTF outlet duct and into the outside rim 3. The HTF radial flow is shown by the arrows 5 in the high magnetic field section (i). The hot HTF exits the high magnetic field section (i) and is introduced via a conduit to into a hot heat exchanger (HHEX). The HHEX cools the heat transfer fluid down to a suitable temperature for introduction as the hot flow into the low magnetic or demagnetized field section (iii).

As mentioned above, the bypass HTF is introduced into a bypass HEX. The bypass HTF cools the process gas that is also introduced into the bypass HEX. In certain embodiments, the bypass HEX includes at least one ortho $H_2$ to para $H_2$ catalyst. The sensible heat in the process gas stream is removed only via the bypass HEX. In other words, no other heat exchangers are required to remove the sensible heat (as mentioned above, the CHEX only removes the reject heat from a colder AMRR stage and very small parasitic heat leaks). As can be seen the approach temperature differential in the bypass HEX is 1 K.

The bypass HTF exiting the bypass HEX is mixed with the hot HTF flow exiting the high magnetic field section (i). The mixed bypass HEX and hot HTT flow is introduced into the HHEX.

FIG. 4 is a schematic of a 3-stage AMRR with continuous bypass flow in a series configuration as a $H_2$ liquefier. Process gas is introduced into the first stage in which it passes through a first bypass heat exchanger. In certain embodiments, prior to the first bypass heat exchanger the process gas passes through a hot heat sink chiller. The hot heat sink chiller or the chiller hot sink is the anchor point for the system. The "anchor point" is the temperature of the ambient or environment that the heat is dumped into. Partially cooled process gas from the first stage bypass heat exchanger is introduced into a second stage bypass heat exchanger. Further cooled process gas from the second stage bypass heat exchanger is introduced into a third stage bypass heat exchanger. In each respective bypass heat exchanger the heat flow (Qdot) is equal to the mass flow (mdot) times the enthalpy differential ($\Delta h$). Each respective AMRR module (AMRR-1, AMRR-2, and AMRR-3) may be the same or similar to the single stage AMRR shown in FIG. 3.

Figure 5:
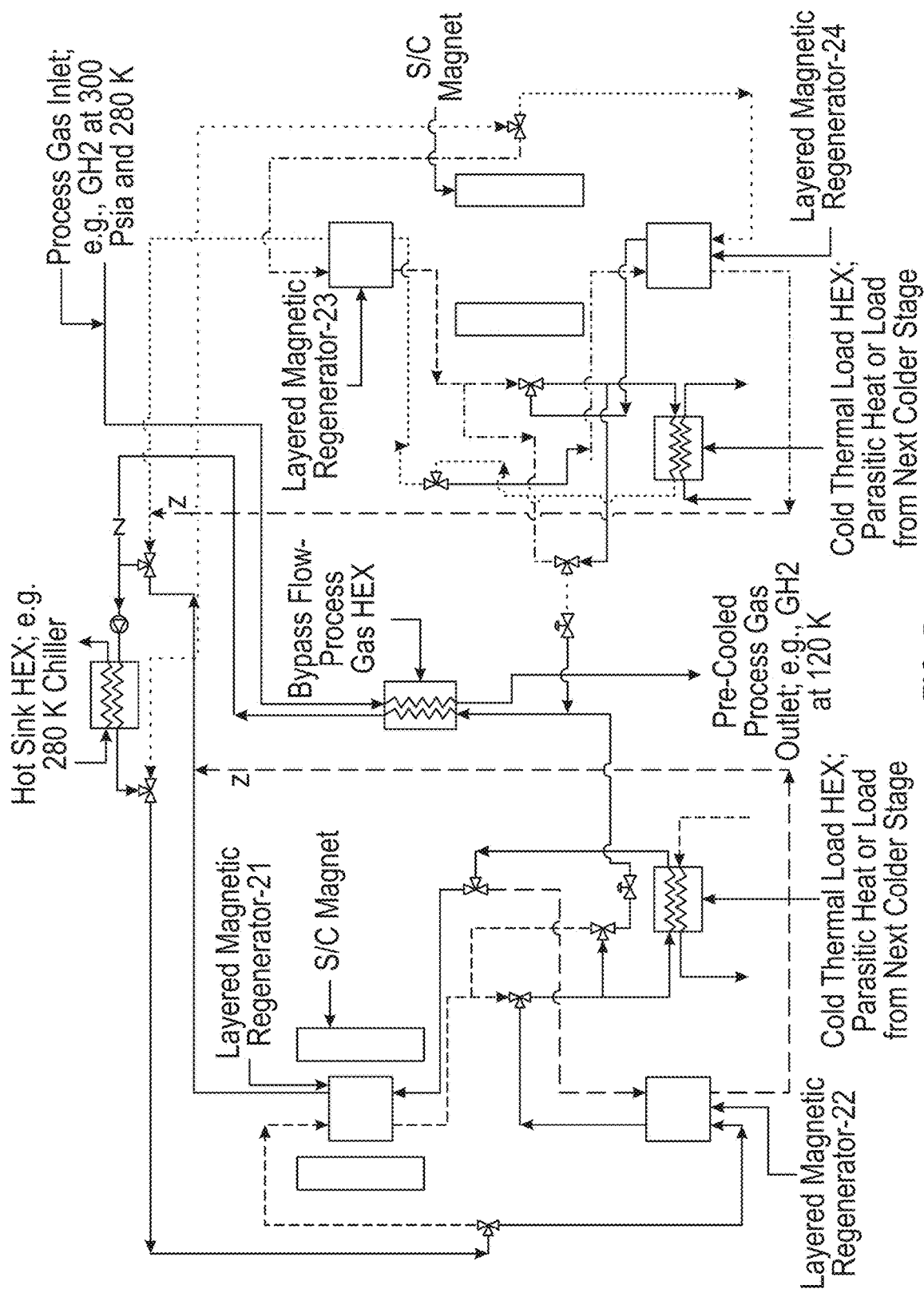
FIG. 5 is a block process flow diagram of a gaseous $H_2$ (GH2) to liquid $H_2$ ($LH_2$) liquefier facility with multistage AMRRs with bypass flow.

FIG. 5 is a block process flow diagram of gas $H_2$ (GH2) to liquid $H_2$ (LH2) liquefier facility with multistage AMRR with bypass flow. FIG. 5 depicts an illustrative GH2 source which may be, for example, a hydrocarbon feedstock (e.g., methane) and/or water from which GH2 is produced via a steam methane reformer (SMR) or an electrolyzer. In certain embodiments, the GH2 may pass through a cryogenic temperature swing adsorption (TSA) module for GH2 purification.

Figure 6:
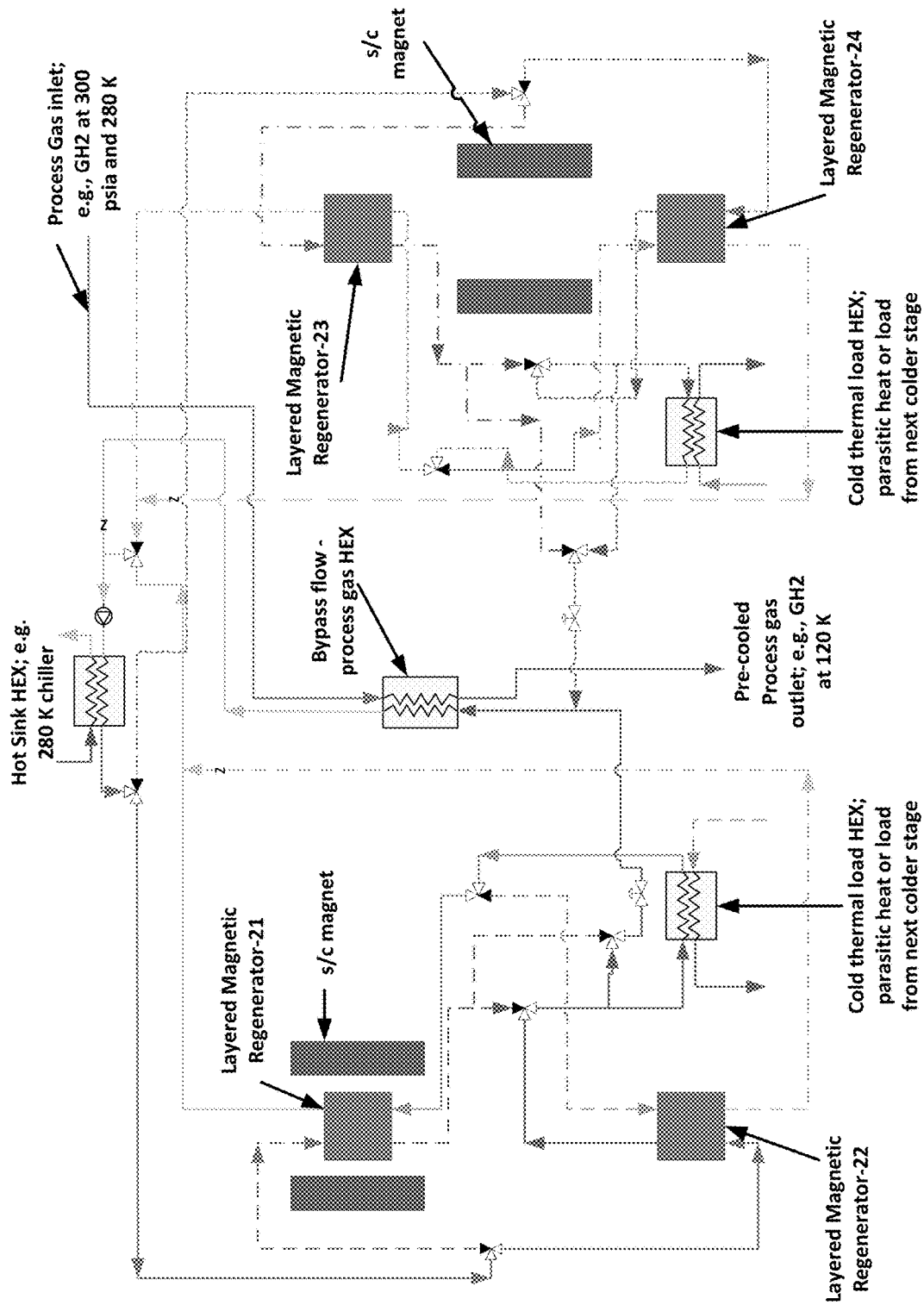
FIG. 6 is a schematic diagram of a helium gas heat transfer sub-system with continuous bypass flow in two sets of reciprocating layered magnetic regenerators with superconducting magnets in an active magnetic regenerator cycle.

FIG. 6 discloses a helium heat transfer gas subsystem and the use of multiple three-way flow control valves to integrate a single heat transfer gas circulating pump, a single hot heat rejection heat exchanger, a single bypass gas heat exchanger with four active magnetic regenerators. The magnets are shown displaced from each other but that is only for convenience of illustrating the demagnetization/magnetization steps of the AMR cycle where no flow occurs in either regenerator. The gas flow lines are also drawn for convenience rather than vertically and close to each other so the regenerators can easily move up and down in and out of high magnetic field region to low field region. Alternatively, the regenerators could remain fixed and the magnets moved reciprocatively so the same geometrical constraints exist.

FIG. 6 is a snapshot in time of four identical layered magnetic regenerators executing AMR cycles with four steps for each regenerator: i) cold-to-hot flow while magnetized; ii) no flow while being demagnetized; iii) hot-to-cold flow while demagnetized; and iv) no flow while being magnetized. In steady-state operation regenerators 1-4 are operating the same cycle but 90 degrees out of phase with each other in the sequence of 1, 3, 2, 4. An important feature of this integrated quad design is the continuous flow of a percentage of heat transfer gas through the bypass heat exchanger. The bypass flow is established by the requirement that it must be large enough to completely pre-cool a desired flow rate of process stream from a hotter temperature to a colder temperature such as 280 K to 120 K.

In FIG. 6, regenerator 21 is magnetized and has cold-to-hot helium gas flow through it; regenerator 22 is demagnetized and has hot-to-cold helium gas flow through it [the temperature of the helium is set by the chiller that sets the outlet temperature of the helium in the hot heat rejection heat exchanger or $T_{HOT}$ [in this example it is 280 K]. Regenerator 22 provides cold helium at a blow-averaged $T_{COLD} - \Delta T_{COLD}/2$ that supplies the cold helium flow into the bypass heat exchanger and a flow to the cold heat exchanger [which could be very small if only parasitic heat leaks are present and there is no lower AMRR stage]. Regenerator 23 has no helium flow and is being magnetized; Regenerator 24 is being demagnetized and has no helium flow either. Note that the three-way valves, flow control valves, and check valves are indicated in the flow loop. There is a single continuously circulating helium pump just before the chiller HEX near the hot temperature. The helium heat transfer gas flows can be traced out by following the open segments in the three-way valves and the same type of line (solid, dotted, dashed, and dot-dashed). As each regenerator is demagnetized, the hot-to-cold flow will provide the bypass flow for of the AMR cycle to ensure the bypass heat exchanger continuously cools the process gas stream.

Illustrative embodiments are described below in the following numbered clauses:

1. A system comprising:
   (a) a liquid natural gas compression module having a compressed liquid natural gas conduit;
   (b) an active magnetic regenerative refrigerator $H_2$ liquefier module;
   (c) at least one $H_2$ gas source fluidly coupled to the active magnetic regenerative refrigerator $H_2$ liquefier module via an $H_2$ gas conduit; and
   (d) a heat exchanger that receives the compressed liquid natural gas conduit and the $H_2$ gas conduit.
2. The system of clause 1, further comprising:
   (e) a fuel cell;
   wherein the fuel cell has an inlet fluidly coupled to the liquid natural gas compression module via a methane conduit and an $H_2$ gas outlet fluidly coupled to the $H_2$ gas conduit.
3. The system of clause 1 or 2, further comprising:
   (f) a liquid natural gas storage tank fluidly coupled to the liquid natural gas compression module;
   (g) a liquid natural gas vehicle dispenser fluidly coupled to the liquid natural gas storage tank;
   (h) a compressed liquid natural gas vehicle dispenser fluidly coupled to the liquid natural gas compression module;
   (i) a liquid $H_2$ vehicle dispenser fluidly coupled to the active magnetic regenerative refrigerator $H_2$ liquefier module; and
   (j) a compressed $H_2$ vehicle dispenser fluidly coupled to the active magnetic regenerative refrigerator $H_2$ liquefier module.
4. The system of any one of clauses 1 to 3, wherein the active magnetic regenerative refrigerator $H_2$ liquefier module comprises (i) a high magnetic field section in which a heat transfer fluid flows from a cold side to a hot side through at least one magnetized bed of at least one magnetic refrigerant, (ii) a first no heat transfer fluid flow section in which the bed is demagnetized, (iii) a low magnetic or demagnetized field section in which the heat transfer fluid flows from a hot side to a cold side through the demagnetized bed, (iv) a second no heat transfer fluid flow section in which the bed is magnetized, and (v) a bypass flow heat exchanger that includes the $H_2$ gas conduit and a conduit for a bypass portion of the heat transfer fluid from the cold side of the low magnetic or demagnetized field section.
5. A process comprising:
   pre-cooling a $H_2$ gas feedstock with a compressed liquid natural gas via a heat exchanger;
   introducing the pre-cooled $H_2$ gas feedstock into an active magnetic regenerative refrigerator $H_2$ liquefier module; and
   delivering liquid $H_2$ from the active magnetic regenerative refrigerator $H_2$ liquefier module to a liquid $H_2$ vehicle dispenser.

In view of the many possible embodiments to which the principles of the disclosed processes and systems may be applied, it should be recognized that the illustrated embodiments are only preferred examples of the invention and should not be taken as limiting the scope of the invention.

What is claimed is:

1. A system comprising:
   (a) a liquid natural gas storage tank fluidly coupled to a first compressor;
   (b) a fuel cell having an inlet fluidly coupled to the first compressor and an $H_2$ gas outlet fluidly coupled to a heat exchanger, wherein the heat exchanger receives compressed liquid natural gas from the first compressor; and
   (c) an active magnetic regenerative refrigerator $H_2$ liquefier that comprises at least one layer of a magnetic refrigerant material, wherein the active magnetic regenerative refrigerator $H_2$ liquefier receives cooled $H_2$ gas from the heat exchanger.

2. The system of claim 1, further comprising:
   (d) a liquid natural gas vehicle dispenser fluidly coupled to the liquid natural gas storage tank;
   (e) a compressed liquid natural gas vehicle dispenser fluidly coupled to the first compressor;
   (f) a liquid $H_2$ vehicle dispenser fluidly coupled to the active magnetic regenerative refrigerator $H_2$ liquefier; and
   (g) a compressed $H_2$ vehicle dispenser fluidly coupled to the active magnetic regenerative refrigerator $H_2$ liquefier module.

3. The system of claim 2, further comprising a second compressor fluidly coupled between the active magnetic regenerative refrigerator $H_2$ liquefier and the compressed $H_2$ vehicle dispenser.

4. The system of claim 3, further comprising a second heat exchanger fluidly coupled between the active magnetic regenerative refrigerator $H_2$ liquefier and the compressed $H_2$ vehicle dispenser.

5. The system of claim 2, wherein the system is a vehicle fueling station.

6. The system of claim 1, wherein the active magnetic regenerative refrigerator $H_2$ liquefier module comprises (i) a high magnetic field section in which a heat transfer fluid flows from a cold side to a hot side through at least one magnetized bed of at least one magnetic refrigerant, (ii) a first no heat transfer fluid flow section in which the bed is demagnetized, (iii) a low magnetic or demagnetized field section in which the heat transfer fluid flows from a hot side to a cold side through the demagnetized bed, and (iv) a second no heat transfer fluid flow section in which the bed is magnetized.

7. The system of claim 6, wherein the system is a vehicle fueling station.

8. The system of claim 1, wherein the system is a vehicle fueling station.

9. The system of claim 1, further comprising a second compressor fluidly coupled to a liquid hydrogen outlet of the active magnetic regenerative refrigerator $H_2$ liquefier.

10. The system of claim 1, wherein the fuel cell is a solid oxide fuel cell.

* * * * *